United States Patent
Matsunaga

(10) Patent No.: US 11,565,718 B2
(45) Date of Patent: Jan. 31, 2023

(54) MOBILE OBJECT CONTROL METHOD, MOBILE OBJECT CONTROL DEVICE, AND STORAGE MEDIUM

(71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 17/211,898

(22) Filed: Mar. 25, 2021

(65) Prior Publication Data
US 2021/0300420 A1 Sep. 30, 2021

(30) Foreign Application Priority Data
Mar. 31, 2020 (JP) .............................. JP2020-061910

(51) Int. Cl.
| | |
|---|---|
| *B60W 60/00* | (2020.01) |
| *B60W 50/02* | (2012.01) |
| *B60W 40/105* | (2012.01) |
| *B60W 30/095* | (2012.01) |
| *G06V 20/58* | (2022.01) |

(52) U.S. Cl.
CPC .... *B60W 60/0015* (2020.02); *B60W 30/0956* (2013.01); *B60W 40/105* (2013.01); *B60W 50/0205* (2013.01); *G06V 20/58* (2022.01); *B60W 2554/80* (2020.02)

(58) Field of Classification Search
CPC ......... B60W 60/0015; B60W 30/0956; B60W 40/105; B60W 50/0205; B60W 2554/80; G06V 20/58
See application file for complete search history.

(56) References Cited

U.S. PATENT DOCUMENTS

| | | | |
|---|---|---|---|
| 2015/0254986 A1* | 9/2015 | Fairfield | G05D 1/0088 707/687 |
| 2016/0197484 A1* | 7/2016 | Jost | G01D 21/00 307/116 |
| 2016/0334230 A1* | 11/2016 | Ross | G01C 21/3415 |
| 2017/0018179 A1* | 1/2017 | Gutierrez | G08G 1/096791 |
| 2017/0141873 A1* | 5/2017 | Mandeville-Clarke | H04W 4/80 |

(Continued)

FOREIGN PATENT DOCUMENTS

JP 2020-042853 3/2020

*Primary Examiner* — Hussein Elchanti
(74) *Attorney, Agent, or Firm* — Amin, Turocy & Watson, LLP

(57) ABSTRACT

A mobile object control method including: recognizing physical objects near a mobile object and a route shape; generating a target trajectory based on a result of the recognition and cause the mobile object to travel autonomously along the target trajectory; and determining that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

9 Claims, 9 Drawing Sheets

(56) References Cited

U.S. PATENT DOCUMENTS

| | | | |
|---|---|---|---|
| 2017/0255199 A1* | 9/2017 | Boehmke | G01S 7/4815 |
| 2017/0262709 A1* | 9/2017 | Wellington | G06V 20/582 |
| 2018/0032076 A1* | 2/2018 | Lombrozo | B60W 30/12 |
| 2018/0040246 A1* | 2/2018 | Yonemura | G08G 1/164 |
| 2018/0053141 A1* | 2/2018 | Shydo, Jr. | G06Q 10/087 |
| 2018/0075538 A1* | 3/2018 | Konrardy | B60W 40/09 |
| 2018/0082494 A1* | 3/2018 | Rech | G05D 1/0088 |
| 2018/0204398 A1* | 7/2018 | Smith | G07C 5/0808 |
| 2018/0349784 A1* | 12/2018 | Zheng | G06V 10/774 |
| 2019/0163176 A1* | 5/2019 | Wang | G05D 1/0027 |
| 2020/0361487 A1* | 11/2020 | Sakamoto | G05B 9/02 |

* cited by examiner

MOBILE OBJECT CONTROL METHOD, MOBILE OBJECT CONTROL DEVICE, AND STORAGE MEDIUM

CROSS-REFERENCE TO RELATED APPLICATION

Priority is claimed on Japanese Patent Application No. 2020-061910, filed Mar. 31, 2020, the content of which is incorporated herein by reference.

BACKGROUND

Field of the Invention

The present invention relates to a mobile object control method, a mobile object control device, and a storage medium.

Description of Related Art

Research and practical application for causing a vehicle to travel autonomously (hereinafter referred to as "automated driving") are in progress (Japanese Unexamined Patent Application, First Publication No. 2020-42853).

SUMMARY

In automated driving, the demand for reliability of a control system is significantly high. Thus, even if there is no apparent failure, it is desirable to determine some type of abnormality and perform maintenance/repair promptly. The same is true for movement control of a vehicle and a mobile object that moves autonomously.

The present invention has been made in consideration of such circumstances, and an objective of the present invention is to provide a mobile object control method, a mobile object control device, and a storage medium capable of determining an abnormality in a control system promptly.

A mobile object control method, a mobile object control device, and a storage medium according to the present invention adopt the following configurations.

(1): According to an aspect of the present invention, there is provided a mobile object control method including: recognizing physical objects near a mobile object and a route shape; generating a target trajectory based on a result of the recognition and cause the mobile object to travel autonomously along the target trajectory; and determining that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

(2): According to another aspect of the present invention, there is provided a method including: recognizing physical objects near a mobile object and a route shape; generating a target trajectory based on a result of the recognition and cause the mobile object to travel autonomously along the target trajectory; and determining that an abnormality has occurred in a control system for causing the mobile object to travel autonomously by performing the recognition when a time period from a timing when a degree of deviation between a reference target trajectory determined by the route shape and serving as a reference for generating the target trajectory in a movement controller and the target trajectory is greater than or equal to a predetermined degree to a timing when the degree of deviation is less than the predetermined degree is greater than or equal to a second predetermined time period and output a determination result.

(3): In the above-described aspect (1), wherein the generating includes setting a risk that is an index value representing a degree at which the mobile object should not approach based on the presence of the physical object recognized by at least the recognizer in an assumed plane represented in a two-dimensional plane when a space near the mobile object is viewed from above and generates the target trajectory so that the mobile object passes through a point where the risk is low, and wherein the method further comprises stopping the determining when a degree of risk based on a risk value due to the presence of the physical object at each point of the target trajectory is higher than or equal to the reference degree.

(4): In the above-described aspect (1), further including: acquiring surrounding environment information of the mobile object; and making a probability of the determining lower when the environment information satisfies a predetermined condition.

(5): In the above-described aspect (1), further including: acquiring a speed of the mobile object; and making a probability of the determining lower when the speed is higher than a reference speed.

(6): In the above-described aspect (1), further including: collecting data for each speed range of the mobile object; and wherein the determining is performed for each speed range of the mobile object.

(7): According to another aspect of the present invention, there is provided a mobile object control device including: a storage device storing a program; and a hardware processor, wherein the hardware processor executes the program stored in the storage device to recognize physical objects near a mobile object and a route shape; generate a target trajectory based on a result of the recognition and cause the mobile object to travel autonomously along the target trajectory; and determine that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

(8): According to still another aspect of the present invention, there is provided a mobile object control device including: a storage device storing a program; and a hardware processor, wherein the hardware processor executes the program stored in the storage device to recognize physical objects near a mobile object and a route shape; generate a target trajectory based on a result of the recognition and cause the mobile object to travel autonomously along the target trajectory; and determine that an abnormality has occurred in a control system for causing the mobile object to travel autonomously by performing the recognition when a time period from a timing when a degree of deviation between a reference target trajectory determined by the route shape and serving as a reference for generating the target trajectory in a movement controller and the target trajectory is greater than or equal to a predetermined degree to a timing when the degree of deviation is less than the predetermined degree is greater than or equal to a second predetermined time period and output a determination result.

(9): According to still another aspect of the present invention, there is provided a computer-readable non-transitory storage medium storing a program to be executed by a computer to: recognize physical objects near a mobile object and a route shape; generate a target trajectory based on a result of the recognition and cause the mobile object to travel autonomously along the target trajectory; and determine that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

(10): According to still another aspect of the present invention, there is provided a computer-readable non-transitory storage medium storing a program to be executed by a computer to: recognize physical objects near a mobile object and a route shape; generate a target trajectory based on a result of the recognition and cause the mobile object to travel autonomously along the target trajectory; and determine that an abnormality has occurred in a control system for causing the mobile object to travel autonomously by performing the recognition when a time period from a timing when a degree of deviation between a reference target trajectory determined by the route shape and serving as a reference for generating the target trajectory and the target trajectory is greater than or equal to a predetermined degree to a timing when the degree of deviation is less than the predetermined degree is greater than or equal to a second predetermined time period and output a determination result.

According to the above-described aspects (1) to (10), it is possible to determine an abnormality in a control system promptly.

DESCRIPTION OF EMBODIMENTS

Hereinafter, embodiments of a mobile object control device, a mobile object control method, and a storage medium of the present invention will be described with reference to the drawings. A mobile object is a structure, which is capable of being moved autonomously by a drive mechanism provided in the mobile object, such as a vehicle, an autonomous walking robot, or a drone. In the following description, it is assumed that the mobile object is a vehicle that moves on the ground and a configuration and a function for causing the vehicle to move on the ground will be described exclusively. However, when the mobile object is a flying object such as a drone, a configuration and a function for moving in a three-dimensional space may be provided in the flying object.

First Embodiment

[Overall Configuration]

Figure 1:
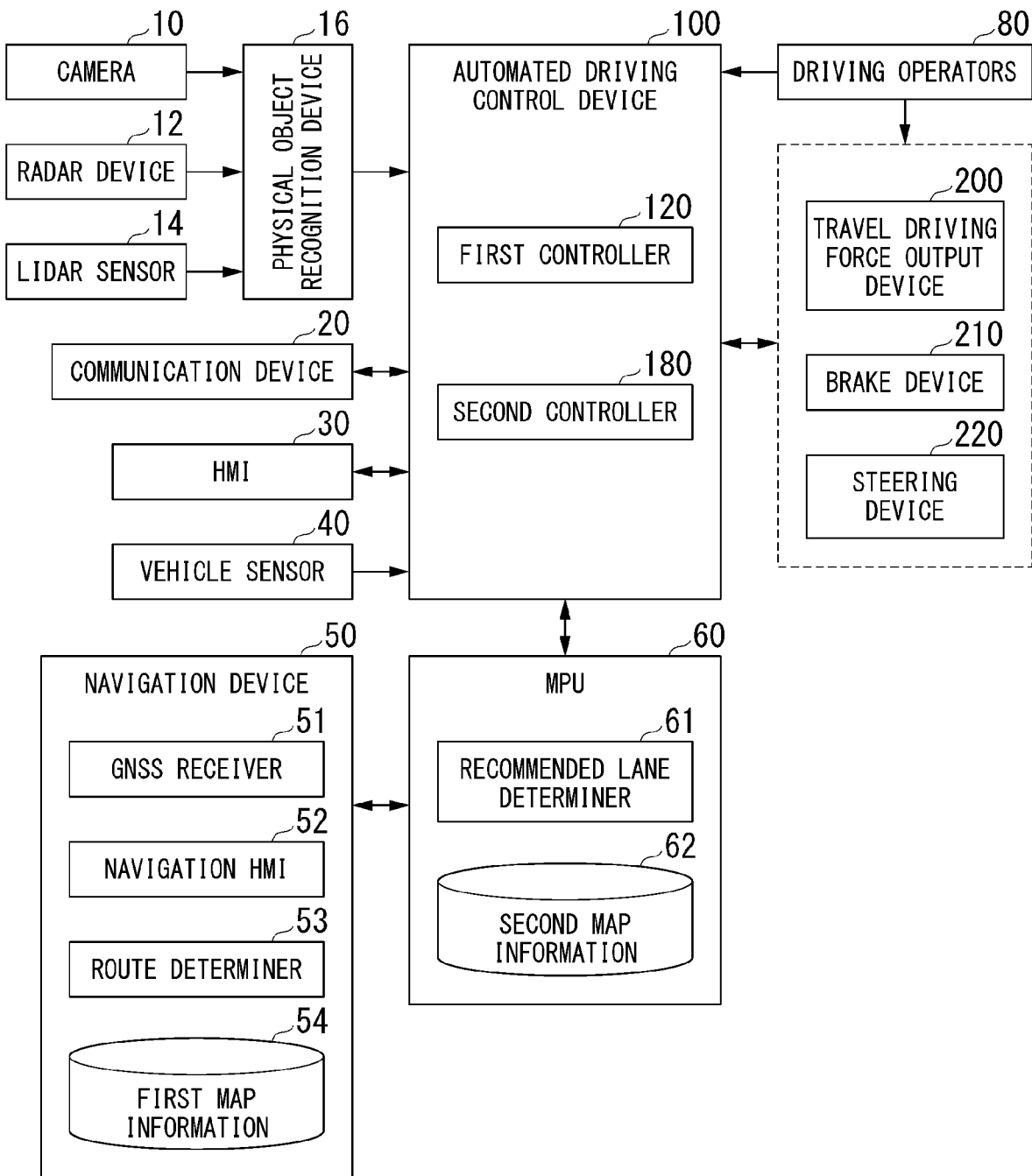
FIG. 1 is a configuration diagram of a vehicle system using a mobile object control device according to an embodiment.

FIG. 1 is a configuration diagram of a vehicle system 1 using a mobile object control device according to an embodiment. For example, a vehicle in which the vehicle system 1 is mounted is a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object based on time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle present in the vicinity of the host vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the host vehicle M and receives an input operation by the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M based on a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a route shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines in what lane numbered from the left the vehicle will travel. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operators 80 include an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 180. Each of the first controller 120 and the second controller 180 is implemented, for example, by a hardware processor such as a central processing unit (CPU) executing a program (software). Some or all of these components are implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "mobile object control device." At least the first controller 120 is an example of a "control system." The "control system" may include the second controller 180.

Figure 2:
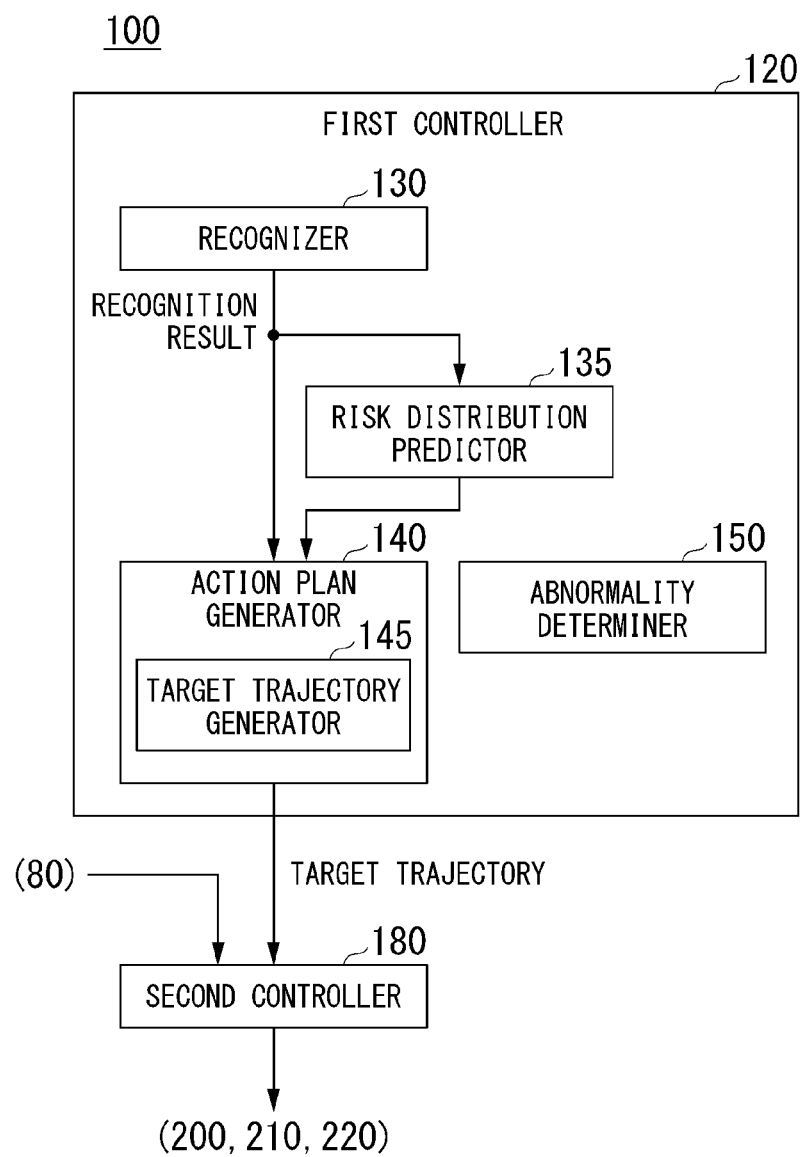
FIG. 2 is a functional configuration diagram of an automated driving control device.

FIG. 2 is a functional configuration diagram of the automated driving control device 100. The first controller 120 includes, for example, a recognizer 130, a risk distribution predictor 135, an action plan generator 140, and an abnormality determiner 150. A combination of the risk distribution predictor 135, the action plan generator 140, and the second controller 180 is an example of a "movement controller." The abnormality determiner 150 is an example of a "determiner."

The recognizer 130 recognizes states of a position, a speed, acceleration, and the like of a physical object around the host vehicle M based on information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize a travel lane by recognizing a traveling path boundary including a road dividing line, a road shoulder, a curb, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the traveling direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The risk distribution predictor 135 sets a risk which is an index value indicating a degree at which the host vehicle M should not enter or approach in an assumed plane S represented in a two-dimensional plane when a space near the host vehicle M is viewed from above. In other words, the risk represents a probability of the presence of a target (including a road shoulder, a guardrail, a non-travelable area such as an area outside a white line as well as a physical object) (the risk may not be a "probability" in the strict sense). An increase in a risk value represents that the host vehicle M should not enter or approach and a risk value close to zero represents that it is preferable that the host vehicle M travel. However, the above relationship may be reversed.

The risk distribution predictor 135 sets risks in the assumed plane S with respect to a current time point and future time points defined at given time intervals such as a current time t, a time after Δt (time t+Δt), and a time after 2Δt (time t+2Δt). The risk distribution predictor 135 predicts the risks at the future time points based on a change in the position of the target that is continuously recognized by the recognizer 130.

Figure 3:
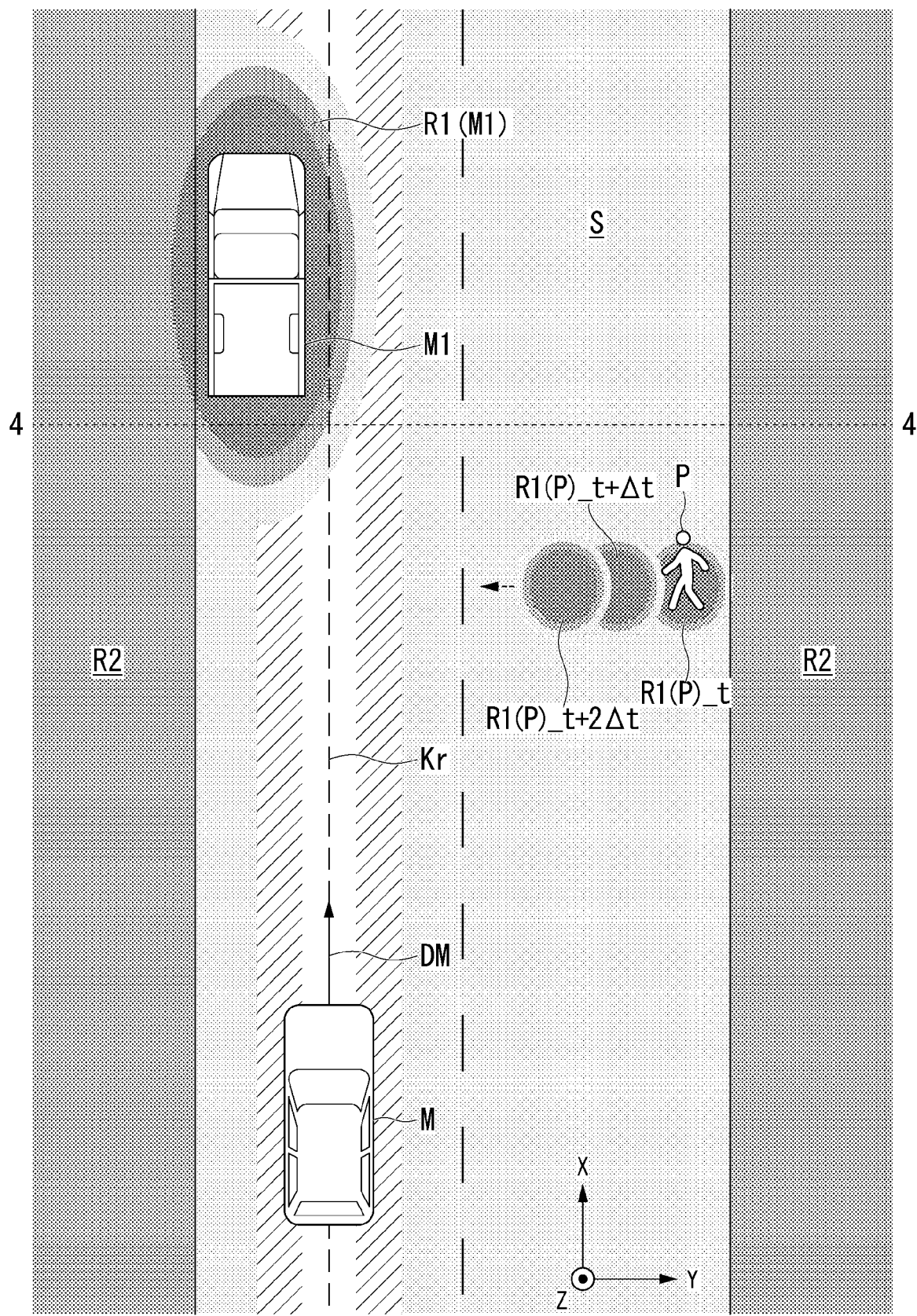
FIG. 3 is a diagram showing an outline of risks set by a risk distribution predictor.
Figure 4:
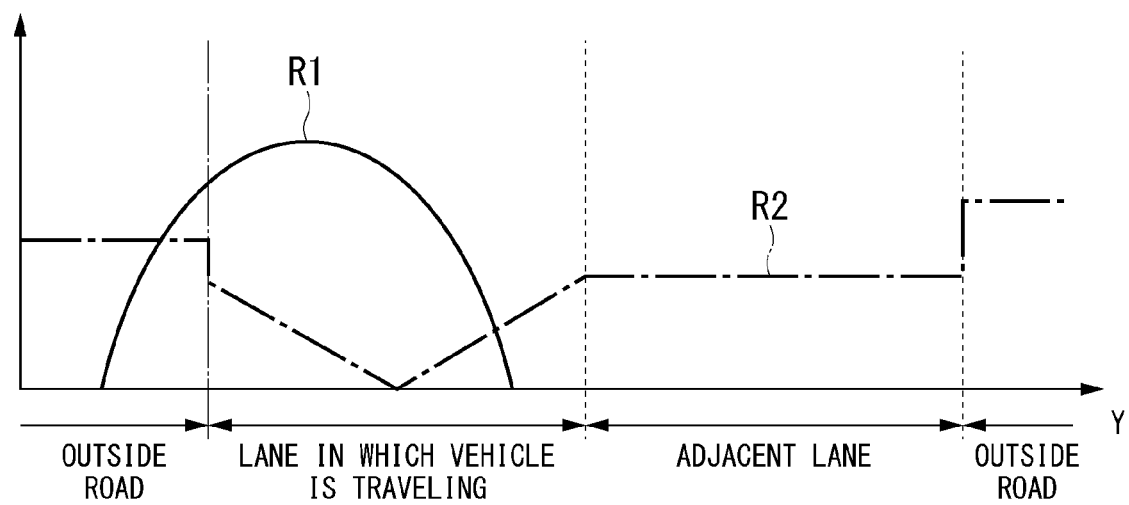
FIG. 4 is a diagram showing values of a first risk and a second risk taken along line 4-4 of FIG. 3.

FIG. 3 is a diagram showing an outline of the risk set by the risk distribution predictor 135. The risk distribution predictor 135 sets a first risk using an ellipse or a circle based on a traveling direction and a speed as a contour line on the assumed plane S with respect to a traffic participant (a physical object) such as a vehicle, a pedestrian, or a bicycle. The risk distribution predictor 135 sets a reference target trajectory based on the route shape recognized by the recognizer 130. For example, the risk distribution predictor 135 sets the reference target trajectory at the center of a lane for a straight road and sets an arc-shaped reference target trajectory near the center of the lane for a curved road. The risk distribution predictor 135 sets a second risk whose value is smallest at a position of the reference target trajectory, increases as a distance from the reference target trajectory to the non-travelable area increases, and becomes constant when the non-travelable area is reached. In FIG. 3, DM denotes the traveling direction of the host vehicle M and Kr denotes the reference target trajectory. R1(M1) is the first risk of a stopped vehicle M1 and R1(P) is the first risk of a pedestrian P. Because the pedestrian P is moving in a direction in which he or she crosses a road, the first risk is set at a position different from that of the current time at each time point in the future. The same is true for moving vehicles, bicycles, and the like. R2 denotes a second risk. As shown in FIG. 3, a density of hatching indicates the risk value and the risk is higher when the hatching is darker. FIG. 4 is a diagram showing values of the first risk R1 and the second risk R2 taken along line 4-4 of FIG. 3.

The action plan generator 140 includes a target trajectory generator 145. In principle, the target trajectory generator 145 generates a future target trajectory along which the host vehicle M is allowed to travel autonomously (independently of a driver's operation) so that the host vehicle M travels in the recommended lane determined by the recommended lane determiner 61 and passes through a point where a risk set by the risk distribution predictor 135 (a sum of the first risk R1 and the second risk R2) is small. For example, the target trajectory includes a speed element. For example, the target trajectory is represented by arranging a plurality of points (trajectory points) at which the host vehicle M is required to arrive in order from a point closest to the host vehicle M. The trajectory point is a point where the host vehicle M is required to arrive for each predetermined traveling distance (for example, about several meters [m]). On the other hand, a target speed and target acceleration for each predetermined sampling time period (for example, about several tenths of a second [sec]) are generated as parts of the target trajectory. The trajectory point may be a position at which the host vehicle M is required to arrive at the sampling time for each predetermined sampling time period. In this case, information of the target speed or the target acceleration is represented by an interval between trajectory points. The action plan generator 140 generates a plurality of target trajectory candidates, calculates scores based on the viewpoints of efficiency and safety, and selects a target trajectory candidate having a high score as the target trajectory. In the following description, a target trajectory, which is a set of trajectory points, may be illustrated in the form of a simple straight line or a broken line.

Figure 5:
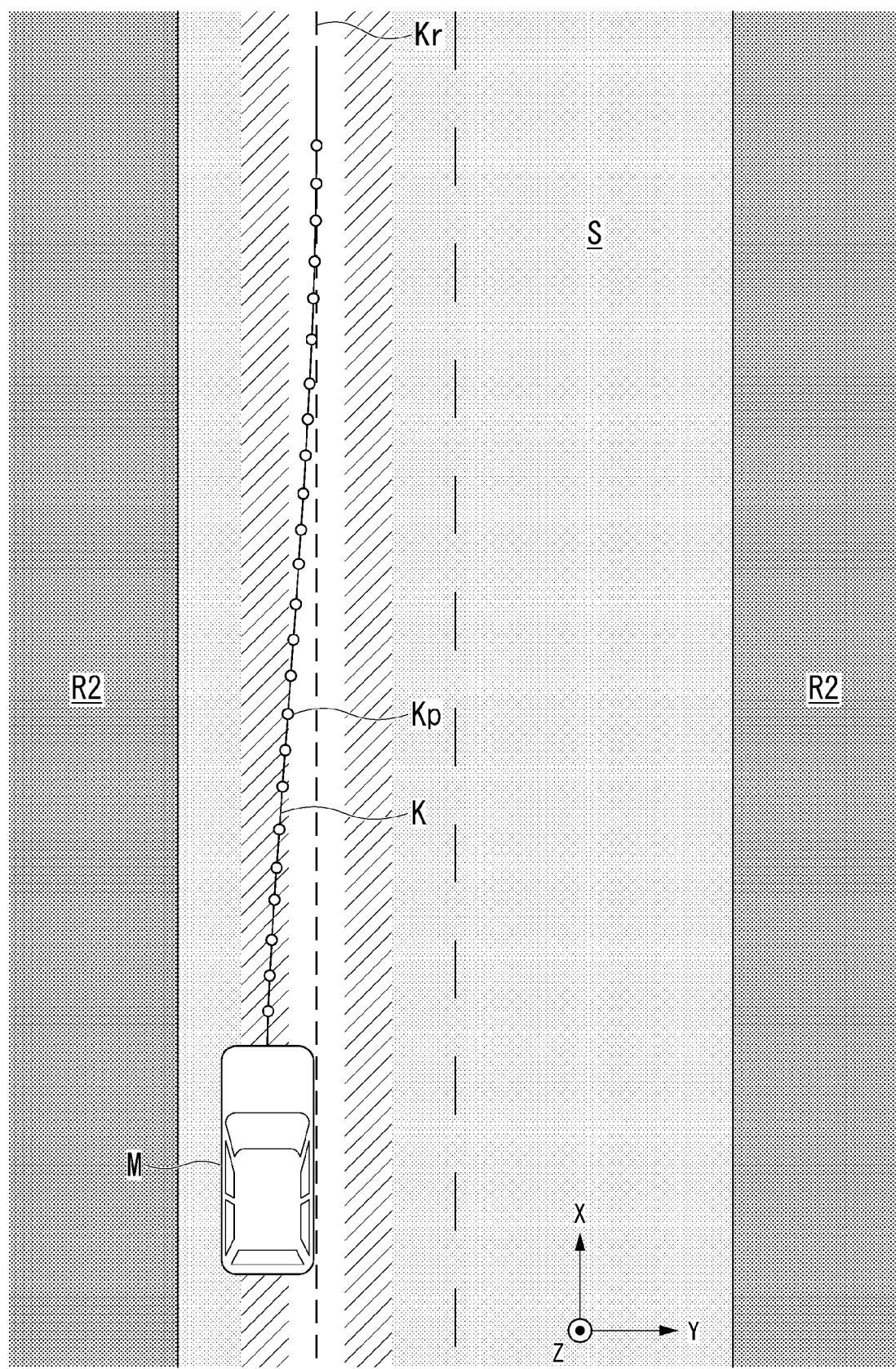
FIG. 5 is a first diagram for describing a process of a target trajectory generator.

The target trajectory generator 145 iteratively generates a target trajectory based on a position and an orientation of the host vehicle M and the reference target trajectory. FIG. 5 is a first diagram for describing a process of the target trajectory generator 145. In the example of FIG. 5, because there is no object that causes the first risk R1, the target trajectory generator 145 generates the target trajectory exclusively in consideration of the second risk R2. In FIG. 5, K denotes the target trajectory and Kp denotes a trajectory point. In this state, the host vehicle M is offset to the left of the center of the travel lane and is inclined to the right in an extending direction of the travel lane. The target trajectory generator 145 generates the target trajectory K so that the host vehicle M approaches a point on the reference target trajectory Kr with a low second risk R2 and avoids sudden turning or acceleration/deceleration. As a result, the target trajectory K converges to the reference target trajectory Kr while drawing a smooth curve. As described above, the reference target trajectory Kr serves as a reference when the target trajectory K is generated.

Figure 6:
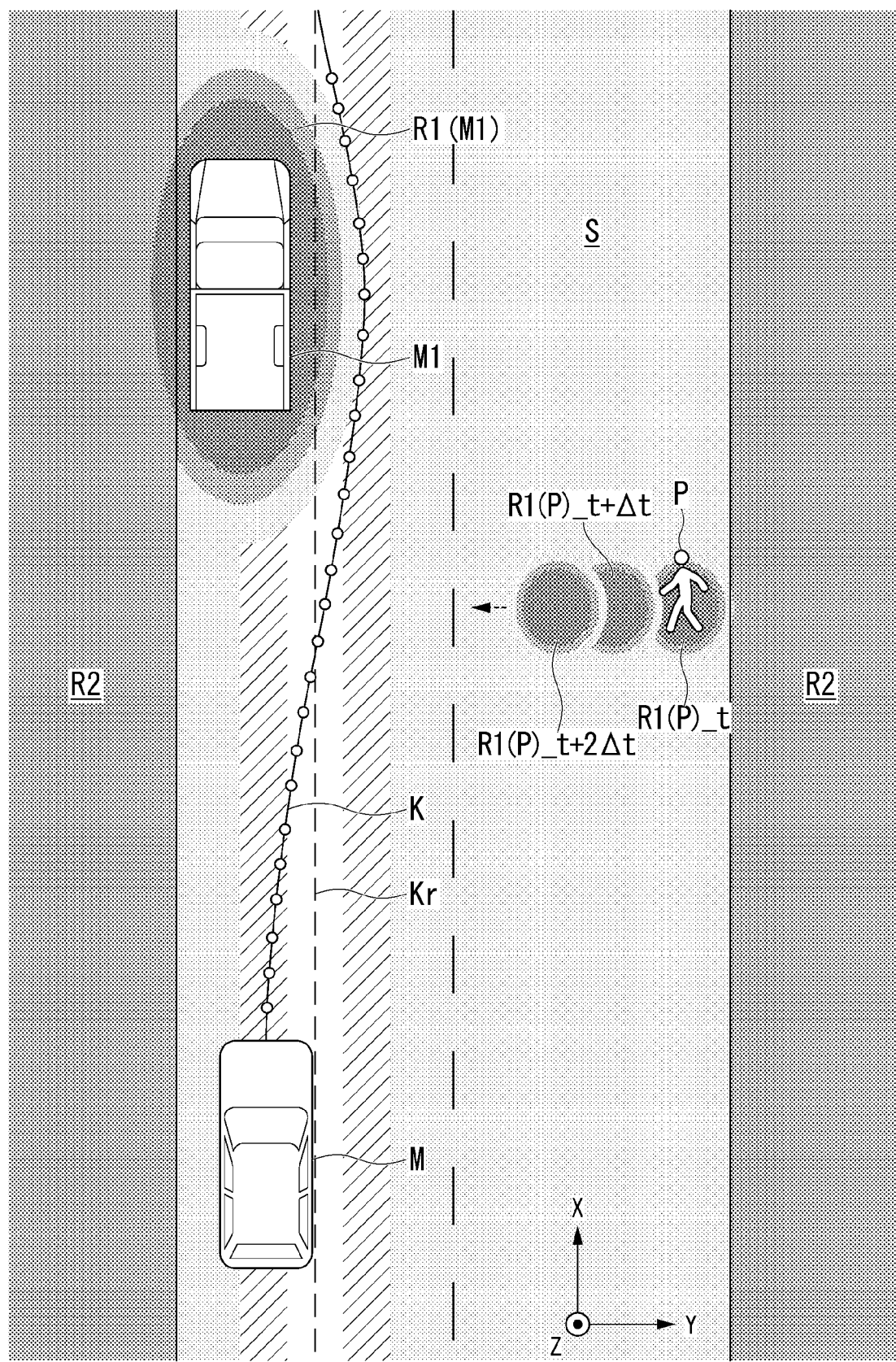
FIG. 6 is a second diagram for describing a process of the target trajectory generator.

When there is an object that causes the first risk R1, the target trajectory K is different from the form shown in FIG. 5. FIG. 6 is a second diagram for describing the process of the target trajectory generator 145. In the example of FIG. 6, the first risk R1 affects the form of the target trajectory K. That is, the target trajectory K that takes a detour to the right in order to avoid the vicinity of a stopped vehicle M1 is generated. It is assumed that the first risk R1(P) caused by the pedestrian P does not affect the target trajectory K because the pedestrian P approaches the travel lane after the host vehicle M passes through the travel lane.

A function of the abnormality determiner 150 will be described below.

The second controller 180 controls the travel driving force output device 200, the brake device 210, and the steering device 220 based on the target trajectory generated by the first controller 120. When information of an amount of operation exceeding the reference has been input from the driving operator 80, the second controller 180 stops the automated driving by the first controller 120 and switches the driving to the manual driving.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 180 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the first controller 120 or the information input from the driving operator 80 so that brake torque according to a braking operation is output to each wheel. The brake device 210 may include a mechanism configured to transfer the hydraulic pressure generated by an operation of the brake pedal included in the driving operators 80 to the cylinder via a master cylinder as a backup. The brake device 210 is not limited to the above-described configuration and may be an electronically controlled hydraulic brake device configured to control the actuator in accordance with information input from the second controller 180 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 180 or the information input from the driving operator 80 to cause the direction of the steerable wheels to be changed.

[Abnormality Determination]

Hereinafter, content of a process of the abnormality determiner 150 will be described. The abnormality determiner 150 determines whether or not an abnormality has occurred in the control system according to the process to be described below. The abnormality determiner 150 determines that an abnormality has occurred in the control system when a time period from a timing when a degree of deviation between a reference target trajectory determined by the route shape recognized by the recognizer 130 and serving as a reference for generating the target trajectory in the target trajectory generator 145 and a position of the host vehicle M is greater than or equal to a predetermined degree to a timing when the degree of deviation is less than the predetermined degree is greater than or equal to a first predetermined time period. When it is determined that an abnormality has occurred in the control system, the abnormality determiner 150 causes the HMI 30 to output information for prompting the driver to perform maintenance and inspection of the host vehicle M. The position of the host vehicle M is a position of a representative point of the host vehicle M as described above. "Matching" means that a difference is within a predetermined range of an error allowable in the field of automobile driving control. Hereinafter, the length that defines the predetermined range is referred to as a reference distance L1. The reference distance L1 is, for example, a length of about 30 [cm].

Figure 7:
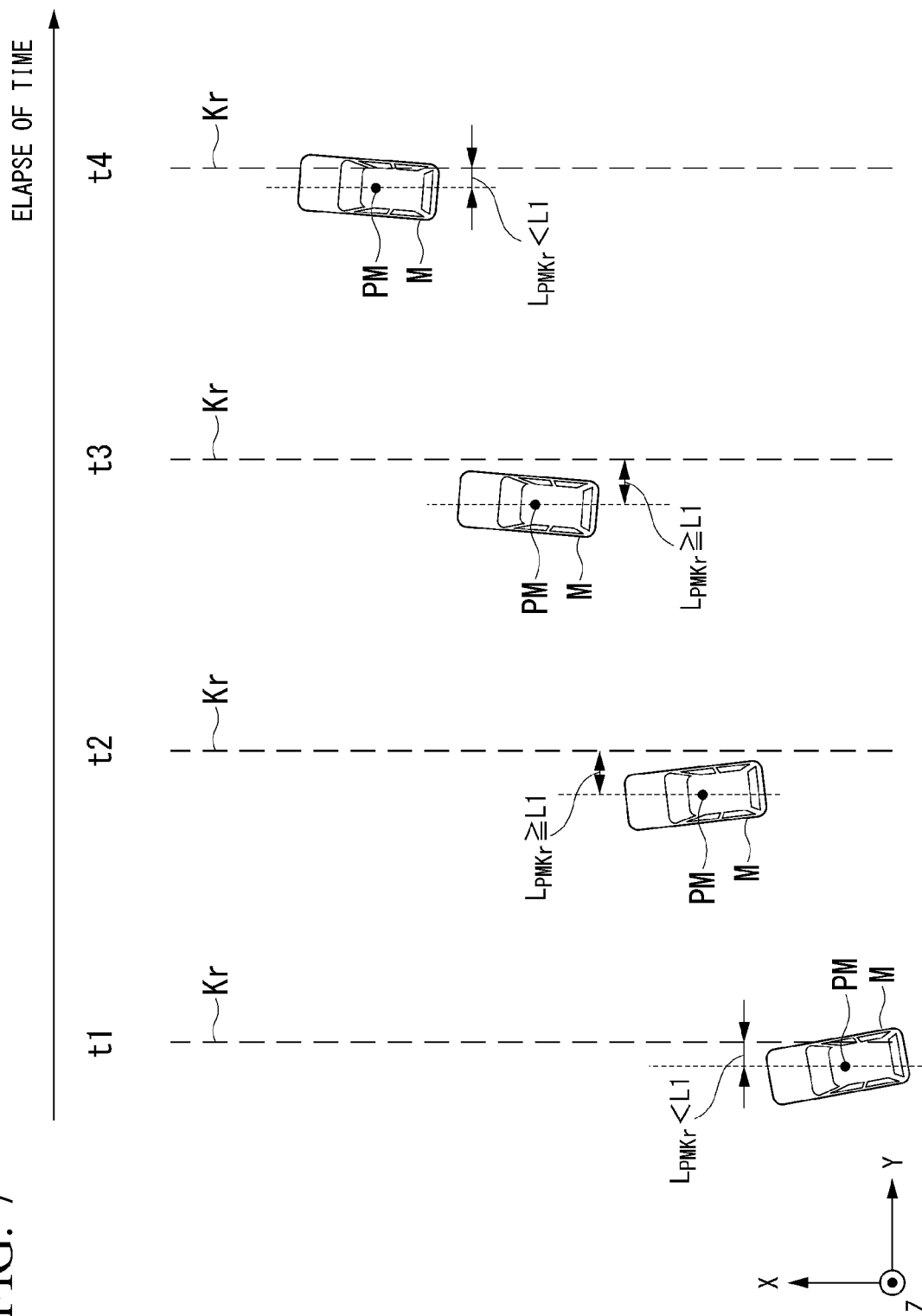
FIG. 7 is a diagram showing a state in which a reference target trajectory and a position of a host vehicle deviate from each other and then match.

FIG. 7 is a diagram showing a state in which a reference target trajectory and a position of the host vehicle M deviate from each other and then match. Because a shortest distance $L_{PMKr}$ between a position PM of the host vehicle M and a reference target trajectory Kr is greater than or equal to the reference distance L1 at a time t2, the abnormality determiner 150 determines that the position PM of the host vehicle M and the reference target trajectory Kr have started to deviate from each other (a degree of deviation is greater than or equal to a predetermined degree). Because the shortest distance $L_{PMKr}$ between the position PM of the host vehicle M and the reference target trajectory Kr is less than the reference distance L1 at a time t4, the abnormality determiner 150 determines that the position PM of the host vehicle M and the reference target trajectory Kr match (the degree of deviation is less than the predetermined degree). In this case, the abnormality determiner 150 determines that an abnormality has occurred in the control system when a time period from the time t2 to the time t4 is greater than or equal to the first predetermined time period. The first predetermined time period is a value obtained in advance by an experiment or the like so that the first predetermined time period has a value near an upper limit of a "time period from a timing when the reference target trajectory and the position of the host vehicle M start to deviate from each other to a timing when the reference target trajectory and the position of the host vehicle M match in the control system known to be operating normally. Alternatively, the abnormality determiner 150 may measure the above-described time period a predetermined number of times and determine that an abnormality has occurred in the control system when the number of times that or a ratio at which the time period from the timing when the reference target trajectory and the position of the host vehicle M start to deviate from each other to the timing when the reference target trajectory and the position of the host vehicle M match is greater than or equal to the first predetermined time period is greater than or equal to a reference value.

[Relaxation/Stop Condition of Abnormality Determination and Others]

The abnormality determiner 150 may obtain a degree of risk obtained by aggregating values of the first risk R1 at each trajectory point related to some or all of the iteratively generated target trajectories K for a period from a timing when the reference target trajectory and the position of the host vehicle M deviate from each other to a timing when the reference target trajectory and the position of the host vehicle M match and prevent a process of determining whether or not the abnormality has occurred in the control system in relation to the target section when the degree of risk is greater than or equal to a threshold value Th (an example of a predetermined degree). A high degree of risk means that the presence of a physical object has a large effect on the target trajectory. As a result, there is a high possibility that the reference target trajectory Kr and the actual trajectory L will deviate from each other as a normal phenomenon. Some or all of the iteratively generated target trajectories K include at least the target trajectory K generated at a point in time when the reference target trajectory and the position of the host vehicle M start to deviate from each other.

The abnormality determiner 150 may acquire surrounding environment information of the host vehicle M and make a probability of the determining lower when the environmental information satisfies a predetermined condition. The environmental information is a time period, weather, a road surface condition, and the like and the predetermined condition is a condition in which the performance of surroundings recognition by the recognizer 130 and the accuracy of control of each device by the second controller 180 are lowered. "Making a probability of the determining lower" means, for example, changing the first threshold value Th1 to a larger value or stopping determining whether or not an abnormality has occurred in the control system. For example, the predetermined condition is the "night time (for example, from 20:00 to 5:00) and the rain of 00 [mm] or more."

The abnormality determiner 150 may acquire the speed of the host vehicle M from the vehicle speed sensor and make a probability of the determining lower when the speed is higher than the reference speed. The meaning of "making a probability of the determining lower" is similar to the above description.

The abnormality determiner 150 may collect a data set of the reference target trajectory and the actual trajectory in accordance with a speed range of the host vehicle M (for example, defined in three stages of a low speed, a medium speed, and a high speed) and determine whether or not an abnormality has occurred in the control system for each speed range. In this case, the abnormality determiner 150 aggregates the "number of times that or a ratio at which the time period from the timing when the reference target trajectory and the position of the host vehicle M start to deviate from each other to the timing when the reference target trajectory and the position of the host vehicle M match is greater than or equal to the first predetermined time period" for each speed range and determines that an abnormality has occurred in the control system when the number of times or the ratio is greater than or equal to a reference value (in relation to the speed range). The abnormality determiner 150 may determine that an abnormality has occurred in the control system when an abnormality has occurred in the control system in relation to one speed range or determine that an abnormality has occurred in the control system when an abnormality has occurred in the control system in relation to two or more speed ranges.

According to the first embodiment described above, it is possible to find some trouble or performance deterioration even if there is no apparent failure because it is determined that an abnormality has occurred in a control system when the time period from the timing when the reference target trajectory determined by the route shape recognized by the recognizer 130 and serving as a reference for generating the target trajectory and the position of the host vehicle M start to deviate from each other to the timing when the reference target trajectory and the position of the host vehicle M match is greater than or equal to the first predetermined time period. That is, the abnormality determination of the control system can be performed promptly. Conventionally, failure diagnosis on each part constituting the vehicle system has been put into practical use, but for example, whether the combination of hardware and software components is correct for the entire control system related to autonomous driving is not sufficiently verified. On the other hand, in the first embodiment, it is possible to detect that the entire control system is operating normally because the abnormality is determined based on an event that should converge if an influence of disturbance such as a physical object near the host vehicle M is small.

Second Embodiment

Hereinafter, a second embodiment will be described. The abnormality determiner 150 of the first embodiment determines that an abnormality has occurred in the control system when a time period from a timing when a reference target trajectory determined by the route shape recognized by the recognizer 130 and serving as a reference for generating the target trajectory in the target trajectory generator 145 and the position of the host vehicle M start to deviate from each other to a timing when the reference target trajectory and the position of the host vehicle M match is greater than or equal to the first predetermined time period. On the other hand, an abnormality determiner 150 of the second embodiment determines that an abnormality has occurred in the control system when a time period from a timing when a degree of deviation between a reference target trajectory determined by a route shape recognized by a recognizer 130 and serving as a reference for generating a target trajectory in a target trajectory generator 145 and the target trajectory is greater than or equal to a predetermined degree to a timing when the degree of deviation is less than the predetermined degree is greater than or equal to a second predetermined time period. In the second embodiment, for example, "matching" means that a shortest distance between all trajectory points from at least a trajectory point closest to the host vehicle M within the target trajectory to a trajectory point ahead of a predetermined distance and the reference target trajectory is within a reference distance L2. The reference distance L2 may be a distance similar to the reference distance L1 or may be longer than the reference distance L1.

Figure 8:
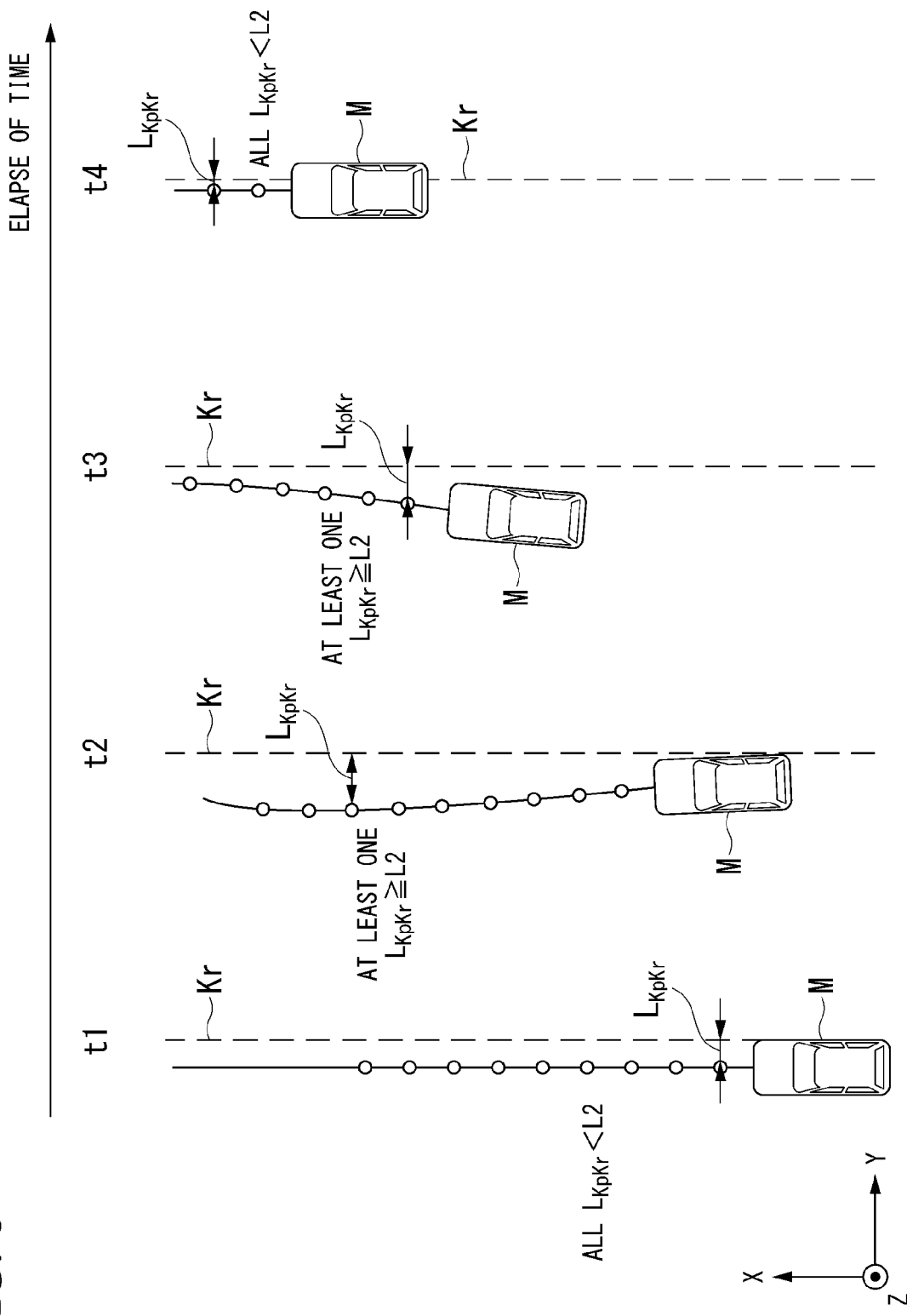
FIG. 8 is a diagram showing a state in which the reference target trajectory and a target trajectory deviate from each other and then match.

FIG. 8 is a diagram showing a state in which the reference target trajectory and a target trajectory deviate from each other and then match. In FIG. 8, the trajectory point closest to the host vehicle M is denoted by Kp_1 and the trajectory point ahead of the predetermined distance is denoted by Kp_n. The abnormality determiner 150 determines that one of the shortest distances $L_{KpKr}$ between the trajectory points and the reference target trajectory Kr becomes the reference distance L2 or more at a time t2, so that they begin to deviate (the deviation becomes a predetermined degree or more). Because all the shortest distances $L_{KpKr}$ between the trajectory points and the reference target trajectory Kr are less than the reference distance L2 at a time t4, the abnormality determiner 150 determines that they match (the deviation is less than a predetermined degree). In this case, the abnormality determiner 150 determines that an abnormality has occurred in the control system when a time period from the time t2 to the time t4 is equal to or longer than the second predetermined time period. The second predetermined time period is a value obtained in advance by an experiment or the like so that the second predetermined time period has a value near an upper limit of a "time period from a timing when the reference target trajectory and the target trajectory start to deviate from each other to a timing when the reference target trajectory and the target trajectory match in the control system known to be operating normally. Alternatively, the abnormality determiner 150 may measure the above-described time period a predetermined number of times and determine that an abnormality has occurred in the control system when the number of times that or a ratio at which the time period from the timing when the reference target trajectory and the target trajectory start to deviate from each other to the timing when the reference target trajectory and the target trajectory match is greater than or equal to the second predetermined time period is greater than or equal to a reference value.

In relation to [Relaxation/stop condition of abnormality determination and others], the second embodiment is similar to the first embodiment.

According to the second embodiment described above, effects similar to those of the first embodiment can be obtained.

[Hardware Configuration]

Figure 9:
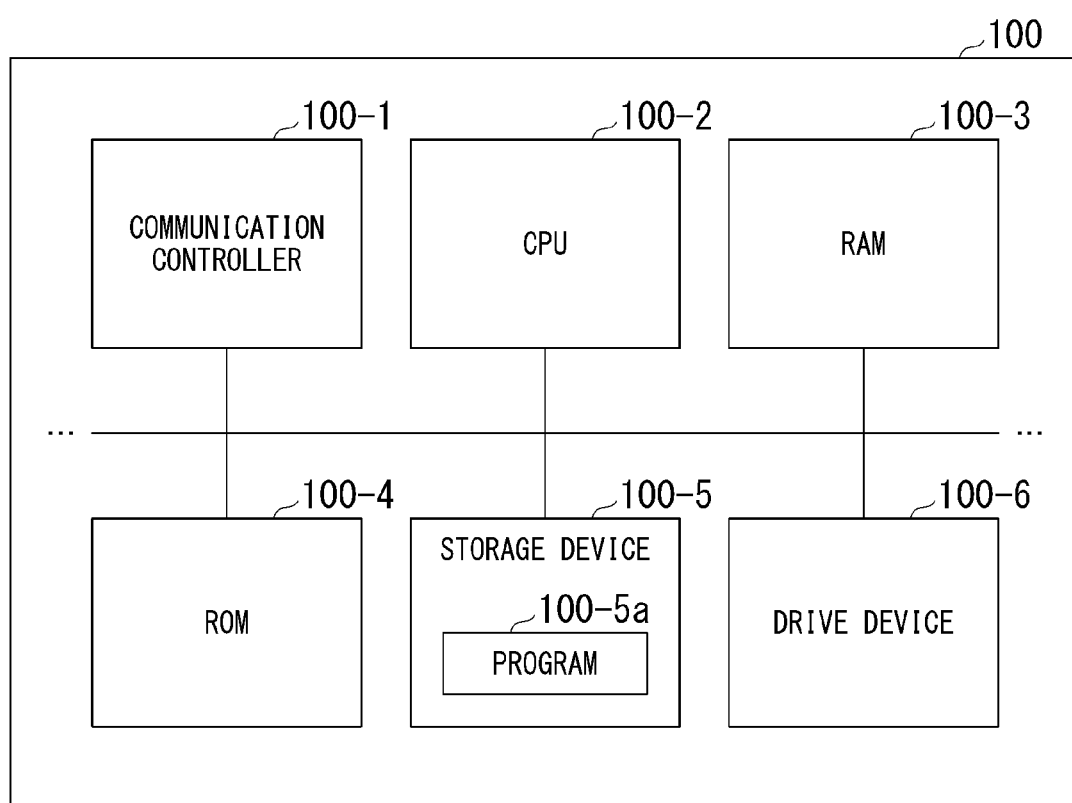
FIG. 9 is a diagram showing an example of a hardware configuration of the automated driving control device of the embodiment.

FIG. 9 is a diagram showing an example of a hardware configuration of the automated driving control device 100 according to the embodiment. As shown in FIG. 9, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded into the RAM 100-3 by a direct memory access (DMA) controller (not shown) or the like and executed by the CPU 100-2. Thereby, some or all of the first controller 120 and the second controller 180 are implemented.

Although modes for carrying out the present invention have been described using embodiments, the present invention is not limited to the embodiments and various modifications and substitutions can also be made without departing from the scope and spirit of the present invention.

What is claimed is:

1. A mobile object control method comprising:
   recognizing physical objects near a mobile object and a route shape;
   generating a target trajectory based on a result of the recognition and cause the mobile object to travel autonomously along the target trajectory; and
   determining that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

2. The mobile object control method according to claim 1, wherein the generating includes setting a risk that is an index value representing a degree at which the mobile object should not approach based on the presence of the physical object recognized by at least the recognizer in an assumed plane represented in a two-dimensional plane when a space near the mobile object is viewed from above and generates the target trajectory so that the mobile object passes through a point where the risk is low, and
   wherein the method further comprises stopping the determining when a degree of risk based on a risk value due to the presence of the physical object at each point of the target trajectory is higher than or equal to the reference degree.

3. The mobile object control method according to claim 1, further comprising:
   acquiring surrounding environment information of the mobile object; and
   making a probability of the determining lower when the environment information satisfies a predetermined condition.

4. The mobile object control method according to claim 1, further comprising:
   acquiring a speed of the mobile object; and
   making a probability of the determining lower when the speed is higher than a reference speed.

5. The mobile object control method according to claim 1, further comprising:
   collecting data for each speed range of the mobile object; and
   wherein the determining is performed for each speed range of the mobile object.

6. A mobile object control device comprising:
   a storage device storing a program; and
   a hardware processor,
   wherein the hardware processor executes the program stored in the storage device to
   recognize physical objects near a mobile object and a route shape;
   generate a target trajectory based on a result of the recognition and cause the mobile object to travel autonomously along the target trajectory; and
   determine that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

7. A mobile object control device comprising:
a storage device storing a program; and
a hardware processor,
wherein the hardware processor executes the program stored in the storage device to
recognize physical objects near a mobile object and a route shape;
generate a target trajectory based on a result of the recognition and cause the mobile object to travel autonomously along the target trajectory; and
determine that an abnormality has occurred in a control system for causing the mobile object to travel autonomously by performing the recognition when a time period from a timing when a degree of deviation between a reference target trajectory determined by the route shape and serving as a reference for generating the target trajectory in a movement controller and the target trajectory is greater than or equal to a predetermined degree to a timing when the degree of deviation is less than the predetermined degree is greater than or equal to a second predetermined time period and output a determination result.

8. A computer-readable non-transitory storage medium storing a program to be executed by a computer to:
recognize physical objects near a mobile object and a route shape;
generate a target trajectory based on a result of the recognition and cause the mobile object to travel autonomously along the target trajectory; and
determine that an abnormality has occurred in a control system for causing the mobile object to travel autonomously by performing the recognition when a time period from a timing when a degree of deviation between a reference target trajectory determined by the route shape and serving as a reference for generating the target trajectory and a position of the mobile object is greater than or equal to a predetermined degree to a timing when the degree of deviation is less than the predetermined degree is greater than or equal to a first predetermined time period and output a determination result.

9. A computer-readable non-transitory storage medium storing a program to be executed by a computer to:
recognize physical objects near a mobile object and a route shape;
generate a target trajectory based on a result of the recognition and cause the mobile object to travel autonomously along the target trajectory; and
determine that an abnormality has occurred in a control system for causing the mobile object to travel autonomously by performing the recognition when a time period from a timing when a degree of deviation between a reference target trajectory determined by the route shape and serving as a reference for generating the target trajectory and the target trajectory is greater than or equal to a predetermined degree to a timing when the degree of deviation is less than the predetermined degree is greater than or equal to a second predetermined time period and output a determination result.

* * * * *